(12) United States Patent
Wier

(10) Patent No.: US 7,422,173 B2
(45) Date of Patent: Sep. 9, 2008

(54) BELT TENSIONER FOR A SAFETY BELT RETRACTOR

(75) Inventor: Franz Wier, Goeggingen (DE)

(73) Assignee: TRW Automotive GmbH, Alfdorf (DE)

( * ) Notice: Subject to any disclaimer, the term of this patent is extended or adjusted under 35 U.S.C. 154(b) by 292 days.

(21) Appl. No.: 11/028,454

(22) Filed: Jan. 3, 2005

(65) Prior Publication Data

US 2005/0156072 A1 Jul. 21, 2005

(30) Foreign Application Priority Data

Jan. 16, 2004 (DE) .................. 10 2004 002 427

(51) Int. Cl.
*B65H 75/48* (2006.01)
(52) U.S. Cl. ...................................... 242/374
(58) Field of Classification Search ................. 242/374; 280/806, 807; 297/475, 478
See application file for complete search history.

(56) References Cited

U.S. PATENT DOCUMENTS

| | | | | |
|---|---|---|---|---|
| 5,699,976 A | * | 12/1997 | Hori | 242/374 |
| 6,089,492 A | * | 7/2000 | Nagata et al. | 242/374 |
| 6,318,662 B1 | * | 11/2001 | Hori et al. | 242/374 |
| 7,080,799 B2 | * | 7/2006 | Singer et al. | 242/374 |
| 2005/0134034 A1 | * | 6/2005 | Wier | 280/801.1 |

FOREIGN PATENT DOCUMENTS

DE 3718117 12/1988

* cited by examiner

*Primary Examiner*—William A Rivera
(74) *Attorney, Agent, or Firm*—Tarolli, Sundheim Covell & Tummino LLP

(57) ABSTRACT

A belt tensioner for a safety belt retractor has a housing, a piston which is displaceable in the housing, and teeth, which are arranged separated and spaced from the piston.

12 Claims, 3 Drawing Sheets

BELT TENSIONER FOR A SAFETY BELT RETRACTOR

The invention relates to a belt tensioner for a safety belt retractor, with a housing, a piston which is displaceable in the housing, and with teeth.

BACKGROUND OF THE INVENTION

The belt tensioner serves to act upon a belt spool of a belt retractor associated with, in the winding direction of the safety belt, in order to eliminate the so-called belt slack from the safety belt system. So-called pyrotechnic belt tensioners are widespread, in which a compressed gas cartridge is arranged in the housing, which after activation releases a large quantity of gas which is under pressure. This gas acts upon the piston, which then moves in the housing. The movement of the piston is transferred to the belt spool via a pinion engaging into the teeth.

Generally, in such belt tensioners, the problem arises that flow losses occur. At the latest at the moment at which the last tooth of the teeth reaches the pinion, usually (through the opening in the housing in which the pinion is arranged) a large outflow opening is produced for the compressed gas. This reduces the power of the belt tensioner, because the piston is acted upon with decreasing pressure towards the end of its stroke.

The object of the invention consists in further developing a belt tensioner of the type initially mentioned to the effect that a tensioning power is maintained over the entire piston stroke.

BRIEF DESCRIPTION OF THE INVENTION

To solve this problem, provision is made according to the invention that the teeth are arranged spatially separate from the piston. This makes it possible to seal the piston in an optimum manner, for example by means of an O-ring, so that a high system pressure can be maintained over the entire stroke.

Advantageous developments of the invention will be apparent from the sub-claims.

BRIEF DESCRIPTION OF THE DRAWINGS

The invention is described below with the aid of a preferred embodiment which is illustrated in the enclosed drawings. In these.

DETAILED DESCRIPTION OF THE INVENTION

Figure 1:
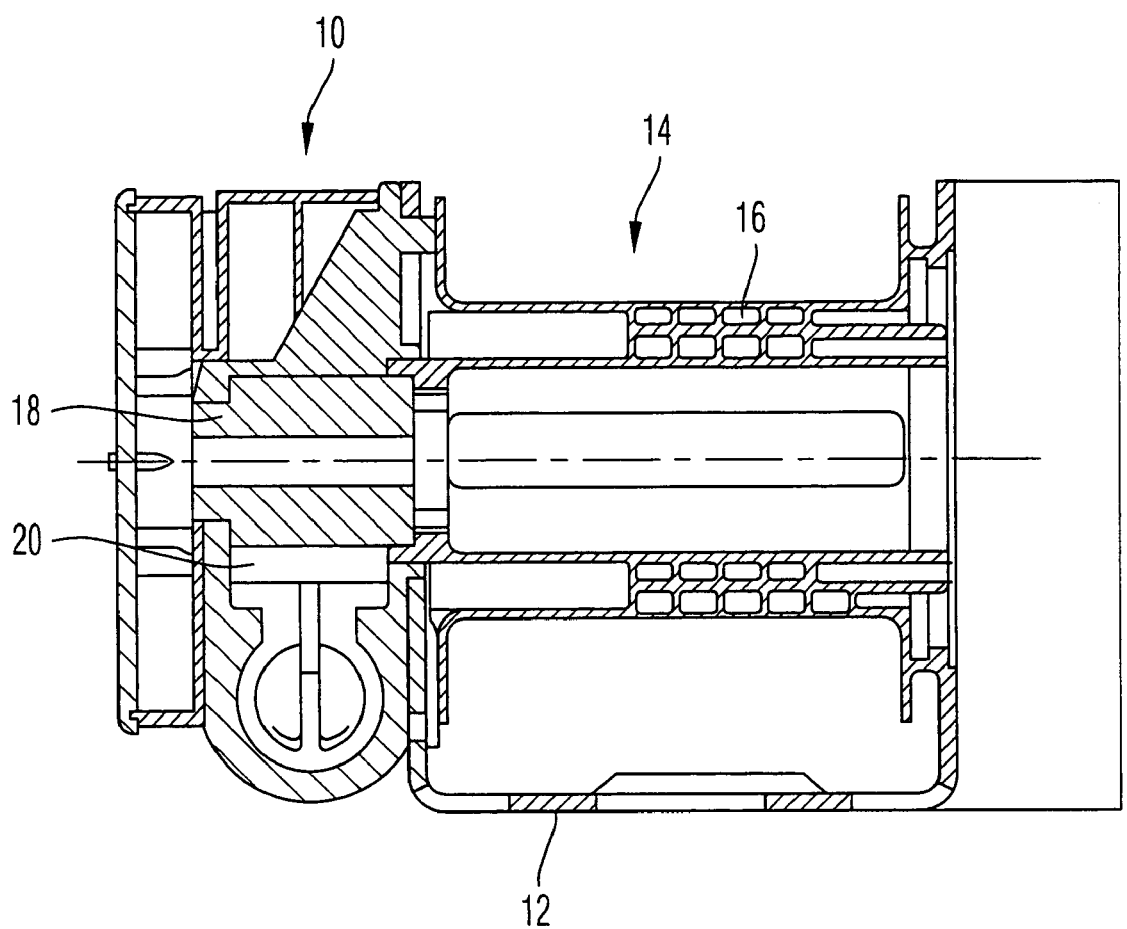
FIG. 1 shows a cross-section through a belt tensioner with a safety belt retractor associated with it.

In the figures, a belt tensioner 10 is shown, which is arranged on a frame 12 of a safety belt retractor 14. The belt tensioner 10 serves, in the case of need, to drive a belt spool 16 of the belt retractor 14 in the belt band winding direction. The connection between the belt tensioner 10 and the belt spool 16 is achieved via a pinion 18, connected with the belt spool 16, into which teeth 20 of the belt tensioner 10 engage.

The belt tensioner 10 has a piston 22 (see in particular FIG. 2), which is displaceable inside a housing 24 of the belt tensioner 10. The piston 22 is constructed with a circular cross-section, and it is arranged in a mounting 26 of the housing 24, which likewise has a circular cross-section and is closed in peripheral direction. On the piston 22 an O-ring 27 is provided, which lies closely against the wall of the mounting 26. In the initial position, the piston 22 lies at the left end of the mounting 26 with respect to FIG. 2, so that a hollow 28 of the piston 22 is arranged on a gas generator 30, which is provided on the base of the mounting 26. In this position of the piston 22, the pinion 18 lies in a free space 32, so that it is freely rotatable.

Figure 2:
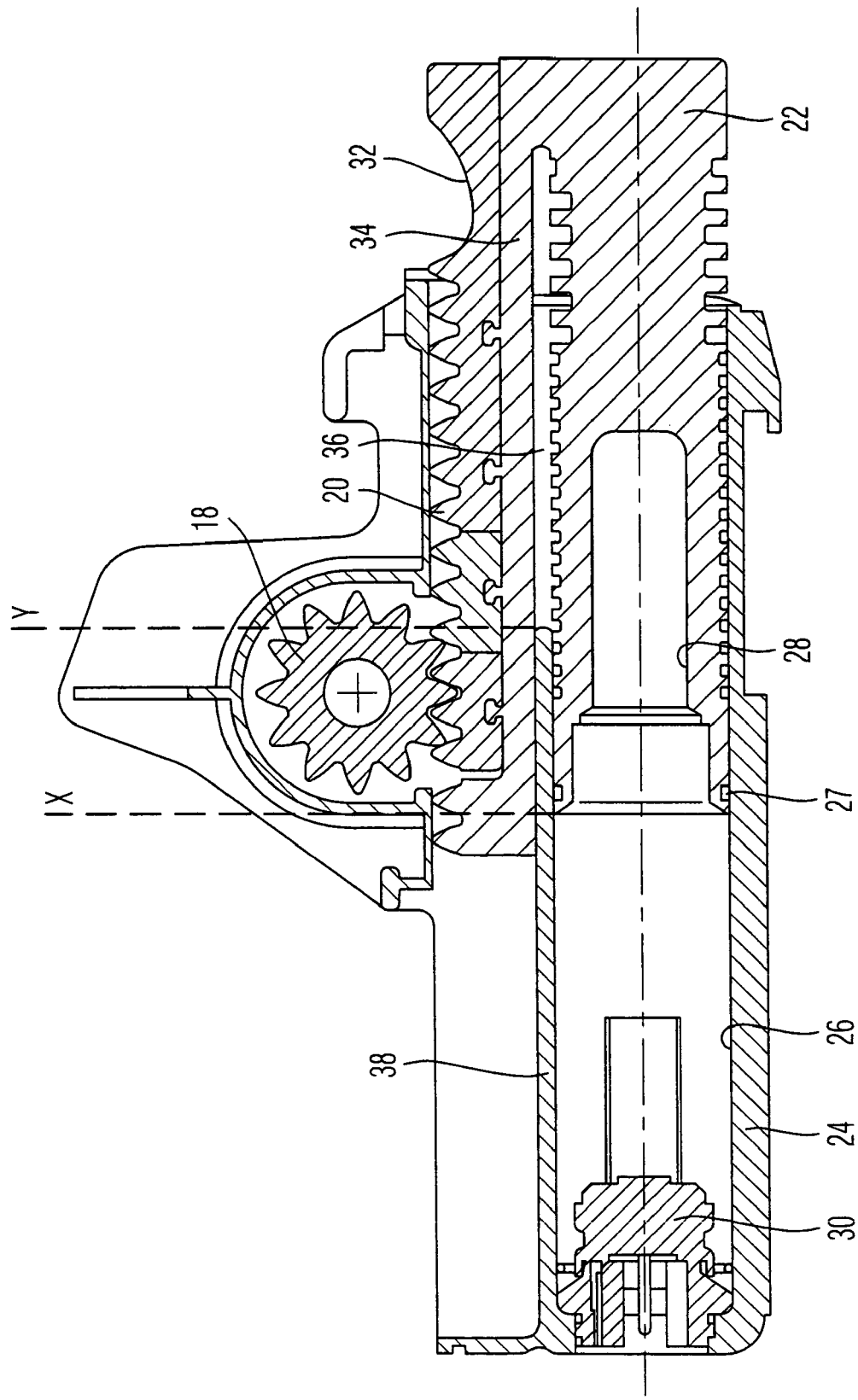
FIG. 2 shows a longitudinal section through the belt tensioner of FIG. 1.

As can be seen in FIG. 2, the teeth 20 are arranged so as to be spaced from the piston 22. They are arranged here on a self-supporting carrier 34, which extends parallel to the outer wall of the piston 22, but is separated therefrom by a free space 36, into which a dividing wall 38 of the housing 24 of the belt tensioner 10 can enter. The piston 22 and the carrier 34 are produced in one piece from a die cast metal material. The carrier 34 rests on the side of the dividing wall 38 facing away from the mounting 26. The teeth 20 consist here of three individual segments which are constructed as separate components and are arranged on the carrier 34, and also two teeth at the rear end, which are constructed in one piece with the carrier 34. In particular, the first segment of the teeth 20 can consist of a high-strength material, so that the stresses which occur after ignition of the gas generator 30 and on striking of the first tooth of the teeth 20 onto the stationary pinion 18, can be reliably absorbed.

It can be seen that independently of the position of the teeth 20 relative to the pinion 18, the piston 22 is displaceable tightly in the mounting 26. Thereby, no pressure losses occur, and the piston 22 is acted upon with high pressure over its entire stroke. Compared with a conventional belt tensioner, in this way a stroke is produced which is greater by approximately one quarter rotation of the pinion 18. This increases the tensioning power.

Figure 3:
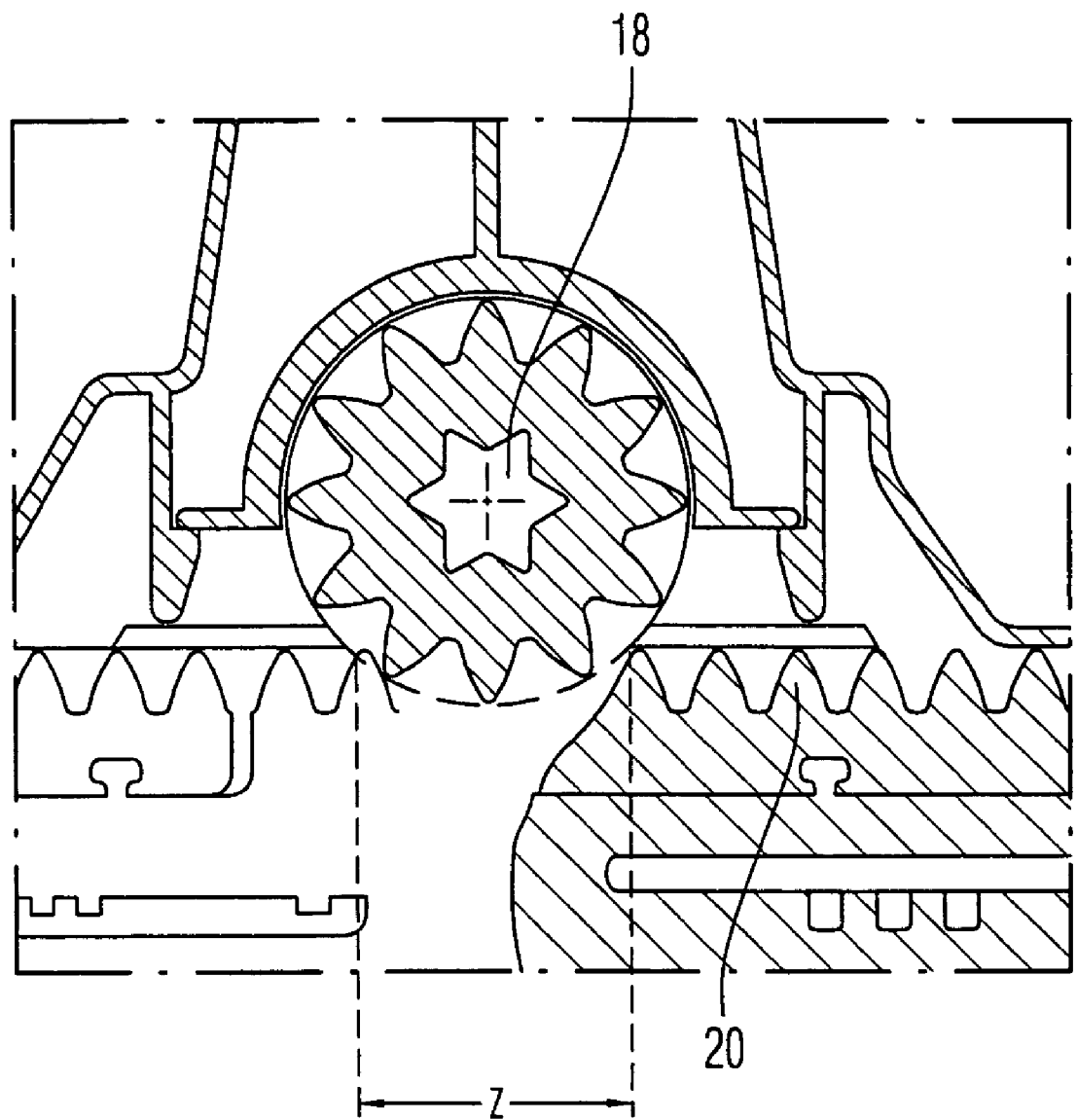
FIG. 3 shows an enlarged cut-out of FIG. 2.

In FIG. 2, the conventional sealing edge of a tensioner, i.e. the point from which compressed gas can escape on tensioning, is designated by X. This point is determined by the point of intersection between the crown circle diameter of the pinion and the pressure chamber, because the pinion dips into the pressure chamber. The sealing edge obtained in the system according to the invention is designated by Y. An additional tensioning path z (see FIG. 3) results from this.

The advantage of the system according to the invention consists in that the pressure chamber is not interrupted by the pinion and therefore the sealed piston path extends beyond the central axis of the pinion. Thereby, the tensioner can be constructed so as to be distinctly shorter.

The invention claimed is:

1. A belt tensioner for a safety belt retractor, with a housing, a piston displaceable in said housing, and teeth movable by said piston to tension a safety belt, said teeth arranged to extend parallel to an outer wall of said piston, said piston having a longitudinal axis such that said teeth are radially separated from said outer wall by a free space when said piston is displaced relative to said housing, wherein said teeth and said outer wall are arranged such that a line perpendicular to the longitudinal axis of said piston extends through said outer wall, at least one of said teeth, and said free space.

2. The belt tensioner according to claim 1, characterized in that said teeth are arranged on a carrier which is connected with said piston at a front end thereof, viewed in a direction of movement.

3. The belt tensioner according to claim 2, characterized in that said teeth comprise a material different from a material of said carrier.

4. The belt tensioner according to claim 1, characterized in that said housing has a mounting for said piston which is closed in a peripheral direction, and that said teeth are arranged outside said mounting when said piston is situated in an initial position.

5. The belt tensioner according to claim 4, characterized in that said piston has an O-ring which seals in said mounting.

6. The belt tensioner according to claim 1, characterized in that a sealed piston path, viewed in a direction of movement of said piston, is delimited behind a sealing edge or a sealing edge lies behind a central axis of a pinion engaging said piston.

7. The belt tensioner according to claim 1, characterized in that said teeth are arranged on a self-supporting carrier extending parallel to said outer wall of said piston.

8. The belt tensioner according to claim 1, characterized in that said housing is provided with a dividing wall arranged in said free space between said teeth and said outer wall of said piston.

9. The belt tensioner according to claim 1, wherein said teeth are located outwardly radially from said outer wall with respect to said longitudinal axis of said piston.

10. A belt tensioner for a safety belt retractor comprising:
a housing having a wall defining a chamber;
a piston axially displaceable in said chamber along a longitudinal axis relative to said wall; and
teeth movable with said piston to tension a safety belt, said wall extending radially between said piston and said teeth.

11. The belt tensioner according to claim 10, wherein said teeth are located radially outwardly from said wall.

12. The belt tensioner according to claim 10, wherein a line extending perpendicular to the longitudinal axis extends from said piston through the wall and at least one of said teeth.

* * * * *